C. G. DURETT.
VISION LENS FOR AUTOMOBILE DRIVERS.
APPLICATION FILED MAR. 25, 1920.
1,368,125. Patented Feb. 8, 1921.
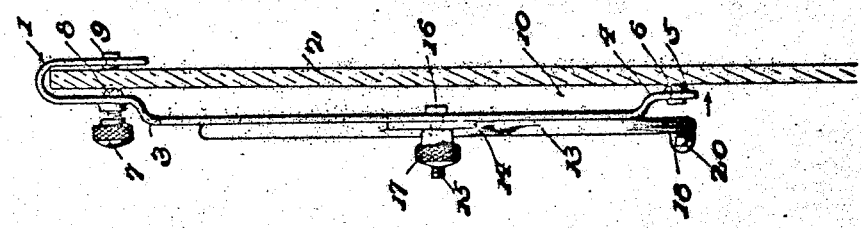
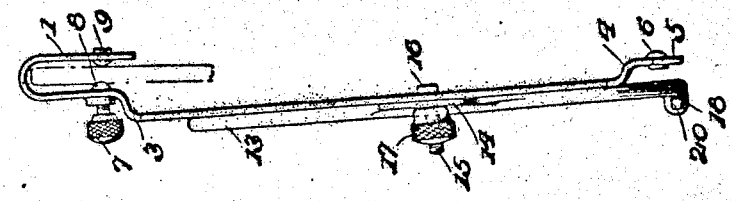
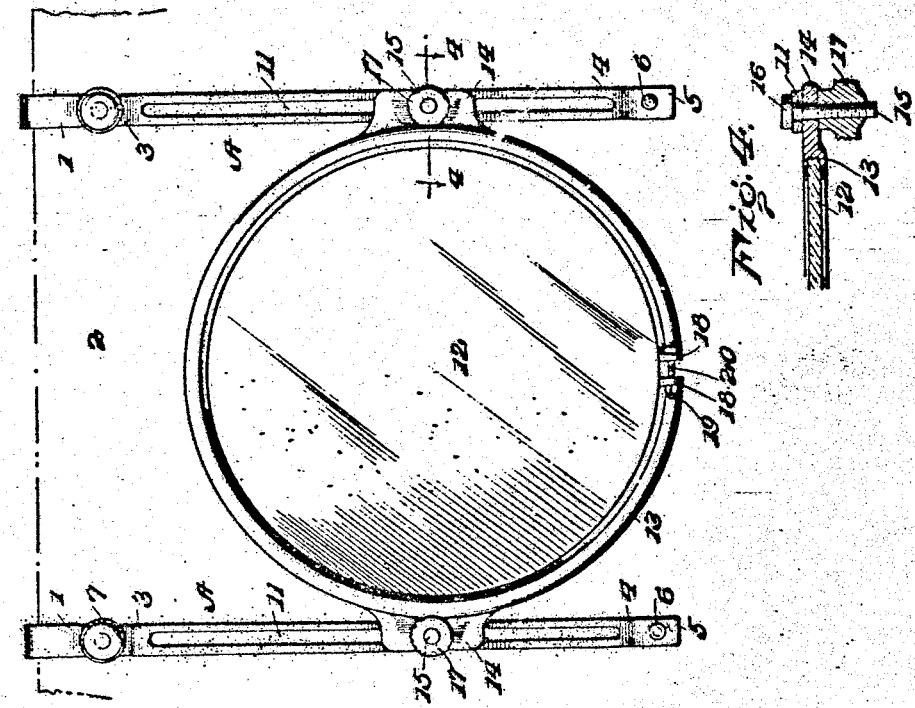
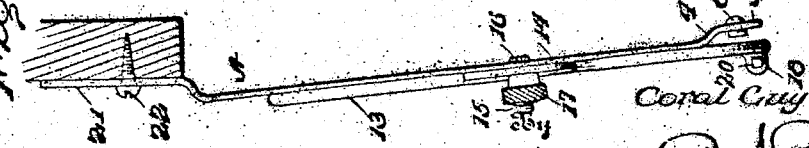
Inventor
Coral Guy Durett.

UNITED STATES PATENT OFFICE.

CORAL GUY DURETT, OF PITTSFIELD, MASSACHUSETTS.

VISION-LENS FOR AUTOMOBILE-DRIVERS.

1,368,125.  Specification of Letters Patent.  Patented Feb. 8, 1921.

Application filed March 25, 1920. Serial No. 368,530.

*To all whom it may concern:*

Be it known that I, CORAL GUY DURETT, a citizen of the United States, residing at Pittsfield, in the county of Berkshire and State of Massachusetts, have invented certain new and useful Improvements in Vision-Lenses for Automobile-Drivers, of which the following is a specification, reference being had therein to the accompanying drawing.

My invention relates to improvements in vision lenses for automobile drivers, of which the following is a description.

In driving automobiles at night great annoyance is caused to drivers of approaching machines by the blinding glare from heavy and bright searchlights, and a great many accidents occur due to the fact that the light rays so blind a driver that he misjudges distances and, in many cases, is unable to see the road or approaching machine at all.

The object of the present invention is to provide a colored glass, auxiliary to the usual windshield glass, through which the driver can see plainly at all times, and not be affected by the glare and dazzling rays of the headlights of automobiles, street cars, sun rays, or the like.

Another object of this invention is to provide a means of attaching the driving lens or glass to the windshield of a machine so that it is adjustable both horizontally and vertically and thus can be adapted to use by drivers of different heights and sizes.

A further object of this invention is to so construct the lens supports, that their lower ends are held firmly against the glass windshield by the inherent spring tension of the supports themselves.

Other and more specific objects of the invention will appear from the following description.

In the accompanying drawings:

Figure 1 is a front view of my improved lens and its supports.

Fig. 2 is a side view of my improved lens and supports, showing the relative normal positions of the upper and lower ends of the support before it is applied to the windshield.

Fig. 3 is a side view showing the invention applied to the windshield of a machine.

Fig. 4 is a sectional view on the line 4—4, of Fig. 1.

Fig. 5 is a side view of a modified form of my invention showing a construction adapted to be used upon a closed machine.

My improved automobile lens comprises two vertical supports A. These vertical supports are composed preferably of flat metal and have their upper ends bent into downwardly extending inverted U-shaped loops 1, which embrace the upper edge of the windshield 2.

The upper ends of the supports A are connected to the loops by an inward bend 3, while their lower ends have an inward bend 4 terminating in a flat end 5, which is provided with a rubber button 6, to engage the glass face of the windshield 2.

The loops 1 of the supports are clamped firmly to the windshield by a thumb screw 7, having a rubber inner end 8. The loops are provided with rubber buttons 9, which bear against the outer face of the windshield 2, at a point opposite the thumb screw 7.

It will be noted that due to the bends 3 and 4 in the supports, the normal relative positions of the loops 1 and the flat ends 5 are as shown in Fig. 2, but when the invention is applied to the windshield, the parts assume the positions in Figs. 1 and 3, of the drawings which puts a spring tension on the ends 5 and holds them firmly against the windshields, so that they cannot rattle. Another object of the bends 3 and 4 in the supports, is to provide a space 10 between them and the windshield, the purpose of which will be set forth later.

The supports A are provided with elongated vertical slots 11, which extend approximately from the bends 3 at their upper ends to the bends 4 at their lower ends.

An amber or other colored glass or lens 12, provided with a circular frame 13 having ears 14, is slidably mounted upon the supports A, by means of bolts 15, which pass through the bars and the slots 11. At their inner ends the bolts 15 have heads 16, which are slightly greater in cross-section than the slots 11, while their outer ends carry thumb screws 17 by means of which the lens is clamped at any desired position upon the supports.

In moving the lens up and down upon the supports, the heads 16 of the bolts 15 move within the space 10, which is provided by the bends 3 and 4 in the supports, as heretofore described, and are thus held safely away from contact with the glass windshield.

To provide means for inserting and clamping the lens 12 in the frame 13, the ends 18 of the frame are provided with lugs 19 through which pass bolts 20.

It will be understood, although I have designated amber as preferable, the lens or glass 12, can be made of any suitable color, which will subdue light rays, without departing from the spirit of my invention.

In Fig. 5, I have shown a modified form of my invention, as it could be applied to a closed automobile where it is impossible to clamp the supports over the top of the windshield.

In this modified form, I have done away with the loops 1, and have terminated the upper ends of the supports A in flat ends 21, which are held to the upper frame of the top of the machine by means of hooks 22, but in this construction, like in the other figures of the drawings, the supports A normally spring inward against the windshield to cause a spring tension against the shield to prevent rattling of the parts.

By this construction a non-glare lens is provided, which is capable of vertical and lateral adjustment to a position on the shield to suit the driver. It is readily and quickly detached and disassembled to be stored away in a pocket or small space in the car, or it may be left on the shield and moved out of the line of vision when it is not required to be used.

I find by actual tests that the lens need not exceed eight inches in diameter to cover a sufficient radius of vision to meet all requirements, and that amber glass gives a clearer light than with any other colored glass.

Having thus described my invention, what I claim and desire to secure by Letters Patent is:

1. An automobile driving lens adapted for detachable connection with the top of an automobile wind-shield, comprising two parallel supports, the upper ends of the supports having inverted U-shaped loops for receiving the edge of the wind-shield, a clamping means carried by the loops, the supports having elongated slots and extending downwardly and inwardly so as to put their lower ends normally in a vertical plane beyond the outer face of the loops to cause a spring tension of the lower end against the face of the wind-shield when applied thereto, a light diffusing glass and a frame therefor, and the glass and frame vertically slidable upon the inner faces of the supports and in the same vertical plane thereto for the purpose described.

2. An automobile driving lens adapted for detachable connection with the top of an automobile wind-shield, comprising two parallel supports, the upper ends of the supports having inverted U-shaped loops for receiving the edge of the wind-shield, a clamping means carried by the loops, the supports having elongated slots and extending downwardly and inwardly so as to put their lower ends normally in a vertical plane beyond the outer face of the loops to cause a spring tension of the lower end against the face of the wind-shield when applied thereto, a light diffusing glass and a frame therefor, and the frame slidably mounted on the supports for the purpose described.

3. An automobile driving lens adapted for detachable connection with the top of an automobile wind-shield, comprising two parallel supports having elongated slots, the upper ends of the supports having inverted U-shaped loops carrying clamping means for connection with the edge of the wind-shield, the lower ends of the supports being in spring tension connection with the face of the wind-shield, a light diffusing glass, and frame for the glass having outwardly extending ears for slidable engagement with the supports, the parts arranged for the purpose described.

4. An automobile driving lens adapted for detachable connection with the top of an automobile wind-shield, comprising two parallel supports, the supports having elongated slots and having engagement with the wind-shield only at their upper and lower ends, the upper ends of the supports having loops carrying clamping means for engagement with the edge of the wind-shield, the lower ends of the supports being in spring tension connection with the face of the wind-shield, and a light diffusing glass having a frame with outwardly extending ears for slidable connection with the supports.

In testimony whereof I hereunto affix my signature.

CORAL G. DURETT.